United States Patent [19]
Dixit

[11] Patent Number: 5,133,039
[45] Date of Patent: Jul. 21, 1992

[54] AERIAL FIBER OPTIC CABLE CASE

[75] Inventor: Mayankkumar M. Dixit, Bernards Township, Somerset County, N.J.

[73] Assignee: AT&T Bell Laboratories, Murray Hill, N.J.

[21] Appl. No.: 605,712

[22] Filed: Oct. 29, 1990

[51] Int. Cl.⁵ ............................ G02B 6/36; G02B 7/26
[52] U.S. Cl. .................................................... 385/135
[58] Field of Search ................. 350/96.20, 96.21, 96.22

[56] References Cited

U.S. PATENT DOCUMENTS 4,595,255  6/1986  Bhatt et al. .................. 350/96.20
4,805,979  2/1989  Bossard et al. .............. 350/96.20

OTHER PUBLICATIONS

*International Wire & Cable Symposium Proceedings* 1989, "Fiber-To-The-Home Update: Drop Installation Flexibility," by G. S. Cobb, W. H. Bensel, and J. B. Haber and M. M. Dixit, pp. 149-154, Nov. 14, 1989.

Primary Examiner—William L. Sikes
Assistant Examiner—Robert E. Wise
Attorney, Agent, or Firm—R. F. Kip, Jr.

[57] ABSTRACT

An aerial fiber optic cable case comprises an elongated boxlike housing, openings at the ends of the housing for insertion therein from the side of an unbroken aerial fiber optic distribution cable and further insertion therein of the ends of one or more aerial fiber optic drop cables; seals for the passage of such cables through such openings, a tray reversibly mounted with the housing for supporting optical splices between one or more distribution cable fibers and one or more drop cable fibers, and a support frame including two hangers for fastening such case to hang from an aerial support strand. The container formed of the housing and lid is pivotably mounted relative to the hangers to be angularly movable relative thereto between forward and rear limit positions of angular tilt. The lid is slidable forward and back on the housing and is contained to such sliding motion until the lid reaches a rear position at which it can be pivoted to angularly move relative to the housing and to fold down to hang down from the housing in juxtaposition with its back side.

27 Claims, 10 Drawing Sheets

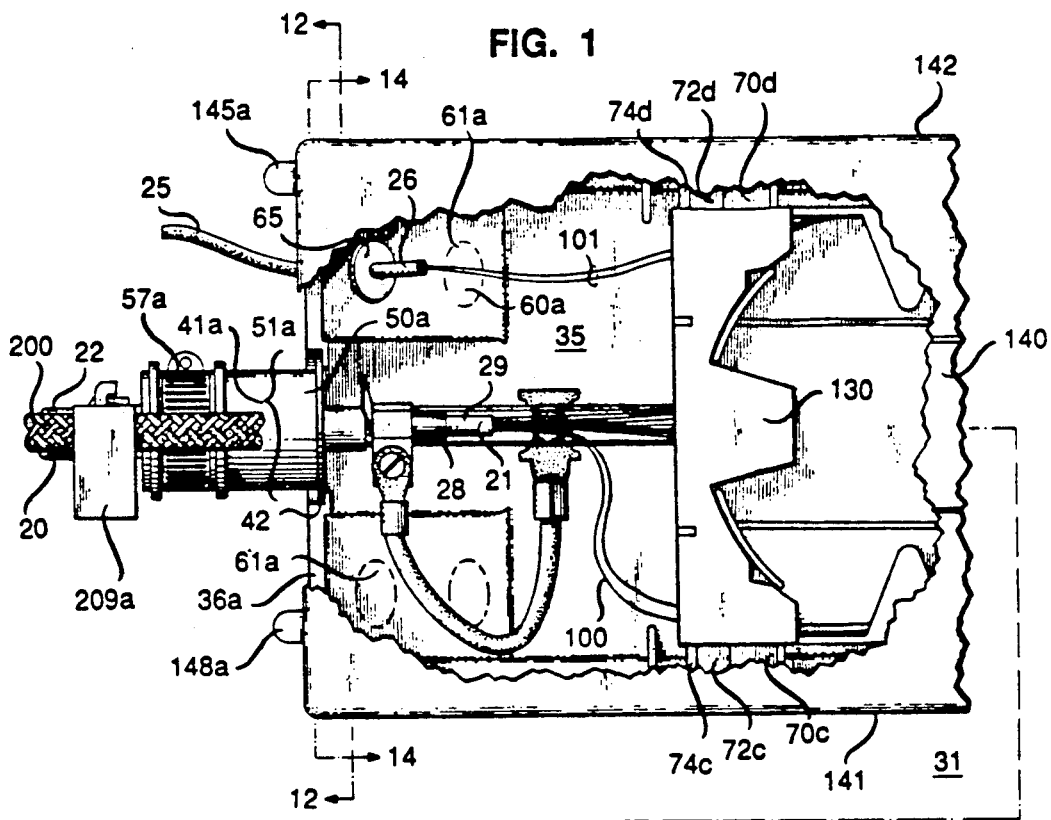
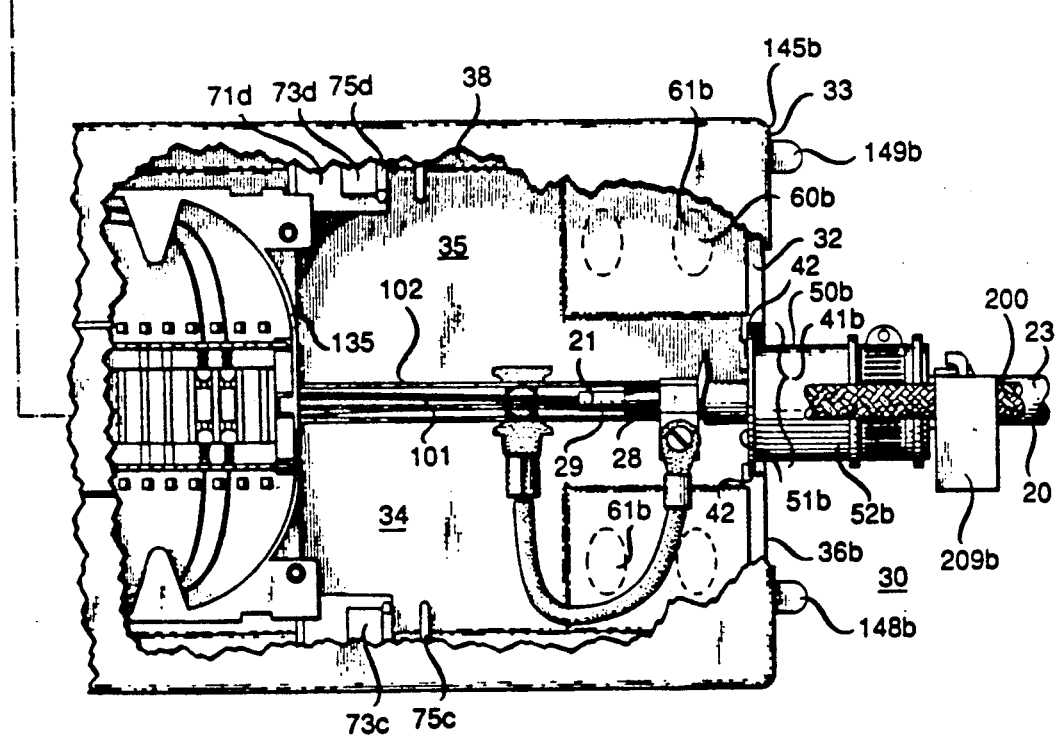
FIG. 1

FIG. 2
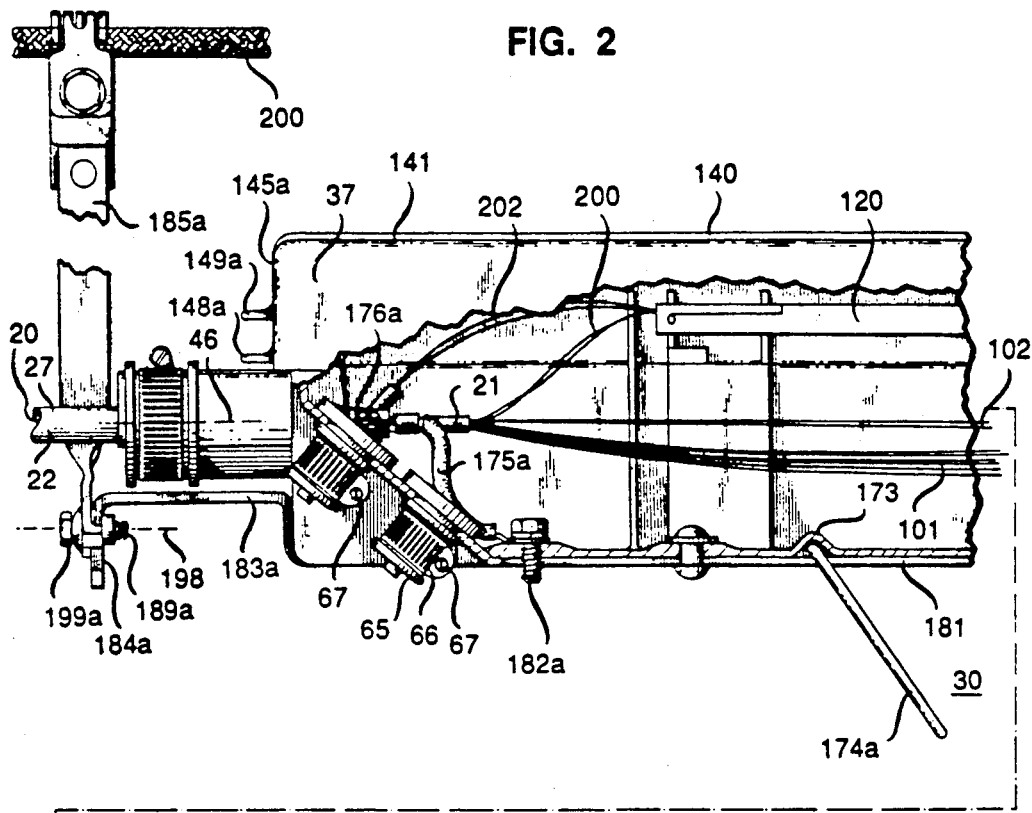
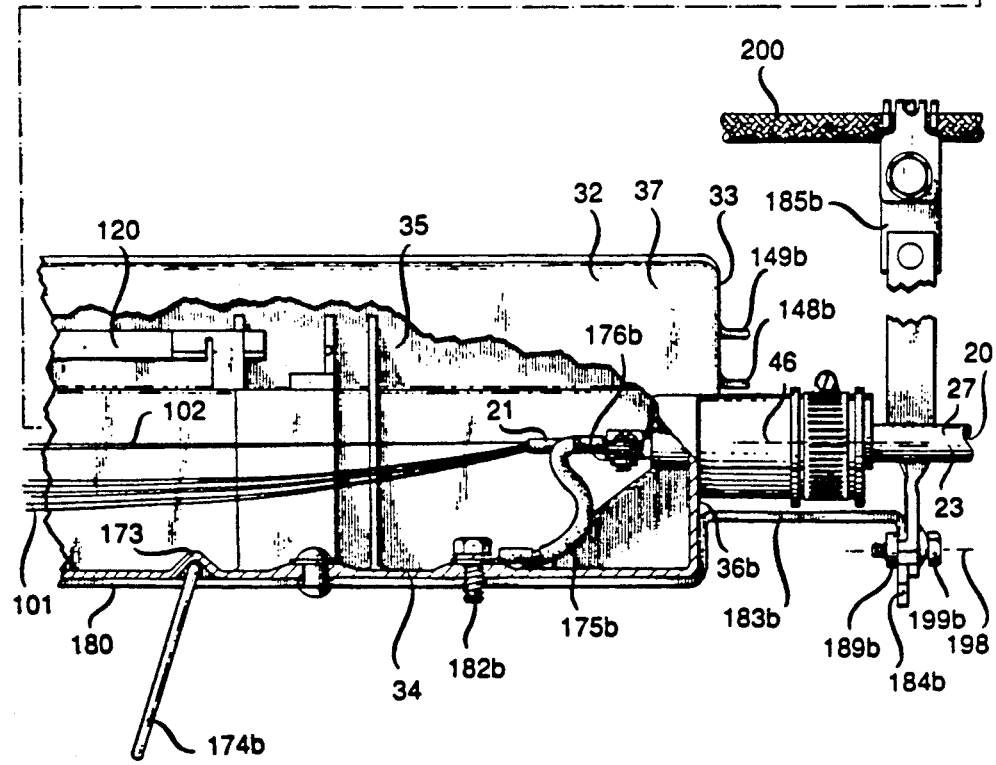

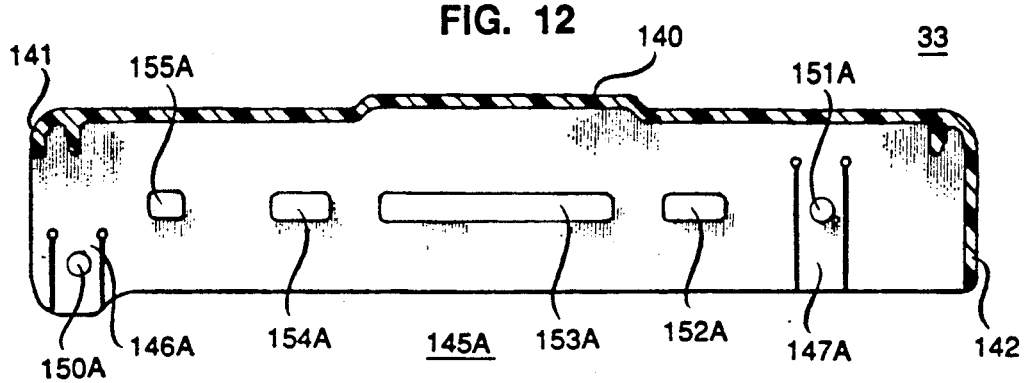
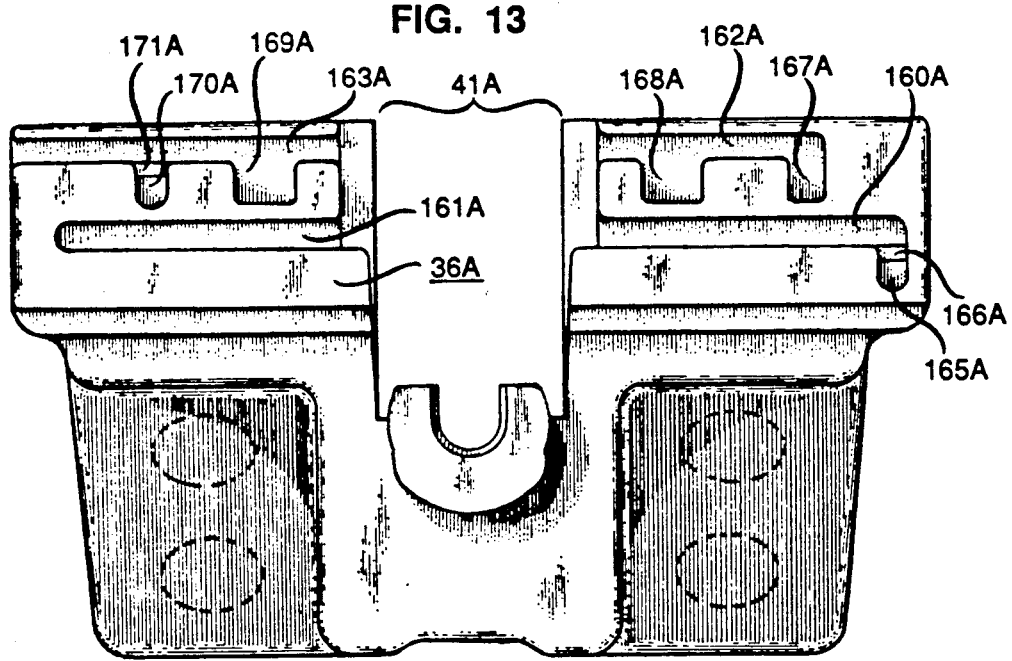
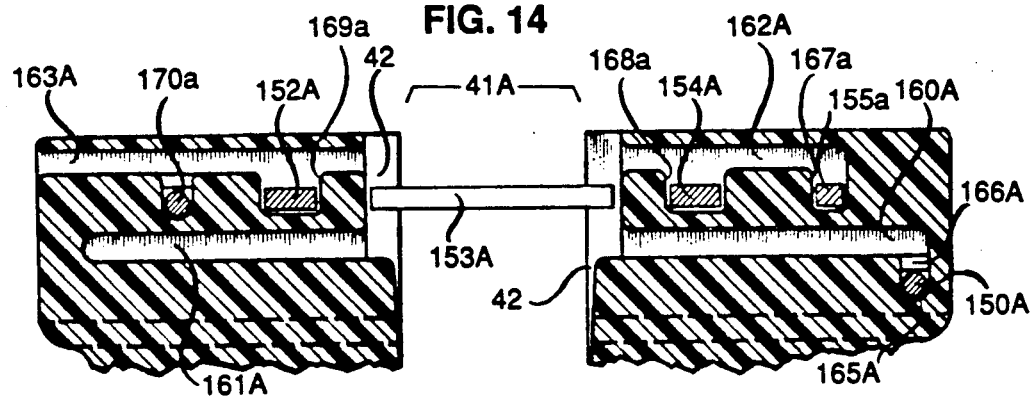

AERIAL FIBER OPTIC CABLE CASE

This invention relates generally to closure structures for optical fibers and fiber optic cables. More particularly, this invention relates to closure structures of such kind adapted for use with aerial fiber optic cables and to be hung from an aerial support cable (or "strand").

BACKGROUND OF THE INVENTION

It is known in the optical telecommunications field to enclose splices of optical fibers within closure structures to the end of protecting such splices from extraneous contact, the weather or other possibly injurious agencies. By way of example, U.S. Pat. No. 4,428,645 issued Jan. 31, 1984 in the name of Kenneth N. Korbelak et al. to G. K. Technologies, incorporated and entitled "Cable Accumulator" ("Korbelak") discloses a splice case comprising a pair of bulkheads providing respective longitudinally spaced circular end walls, a plurality of tie rods rigidly interconnecting the bulkheads, an outer casing formed of semicylindrical halves fastenable on the bulkheads, entry ports in such bulkheads for passage through them of two separate fiber optic cables, a first box-like enclosure mounted between such bulkheads by such rods and adapted to serve as an accumulator for excess lengths of such cables passed through such ports, and a second box-like enclosure on a plate hingedly coupled to the top of the first enclosure to serve as a cover therefor. The second enclosure is adopted to organize optical fibers respective to those two cables and to contain and mechanically protect optical splices of such fibers.

The Korbelak splice case has, however, the disadvantage that it fails to include features whereby it would be well suited to serve as an aerial fiber optic splice case adapted for use with aerial fiber optic cables. In fact, Korbelak teaches away from an aerial splice case in that he discloses that the splicing operation entailed in interconnection of optical fibers does not lend itself to performance at pole-suspension elevation, and such teaching would, of course, be understood as meaning that that aerial fiber optic cable splice cases are impractical.

SUMMARY OF THE INVENTION

This and other shortcomings of the Korbelak splice case are overcome according to the invention hereof in one of its aspects by providing an aerial optic fiber cable splice case comprising, a weather resistant longitudinally-extending container having openings therein for the inserting into the interior thereof of one or more fiber optic cables, means for at least partly sealing the passages through such openings of such one or more cables, means to provide overhead support for such container, such support means being coupled to said container and being adapted in use to extend upward therefrom, and means on such support means for facilitating fastening such support means to an aerial strand to thereby hang the case from such strand. Such an aerial fiber optic cable splice case provides the advantage that it is well adapted to further the making of splices between fibers of fiber optic cables which are aerial cables and to subsequently protect those splices or, otherwise, to aid the implementing above ground of the performing of another function or functions in respect of one or more aerial fiber optic cables.

In the description which follows, elements which are counterparts of each other may be designated by the same reference numeral under different suffixes for such numeral to distinguish such elements, and it is to be understood that any description of one such element shall, unless the context otherwise requires, be taken also as a description of all such counterparts of that element.

BRIEF DESCRIPTION OF THE DRAWING

For a better understanding of the invention, reference is made to the following description of a representative embodiment thereof, and to the accompanying drawings wherein:

FIG. 1 is a plan view drawing of an exemplary embodiment, according to the invention, of an aerial fiber optic cable case, including a housing, cover and tray, parts of such case being shown broken away, and the case being shown installed for use;

FIG. 2 is a front elevation view, partly broken away, of the FIG. 1 case;

FIG. 12 is a view in cross-section, taken as indicated by the arrows 12—12 in FIG. 1 of the cover of the FIG. 1 case;

FIG. 13 is a left side elevation of the housing shown in FIGS. 1 and 5; and

FIG. 14 is a view in cross-section, taken as indicated by the arrows 14—14 in FIG. 1, of the combination of the left hand end wall of the FIG. 1 housing and of the left hand end flap of the FIG. 1 cover.

DETAILED DESCRIPTION OF EMBODIMENT

Figure 3:
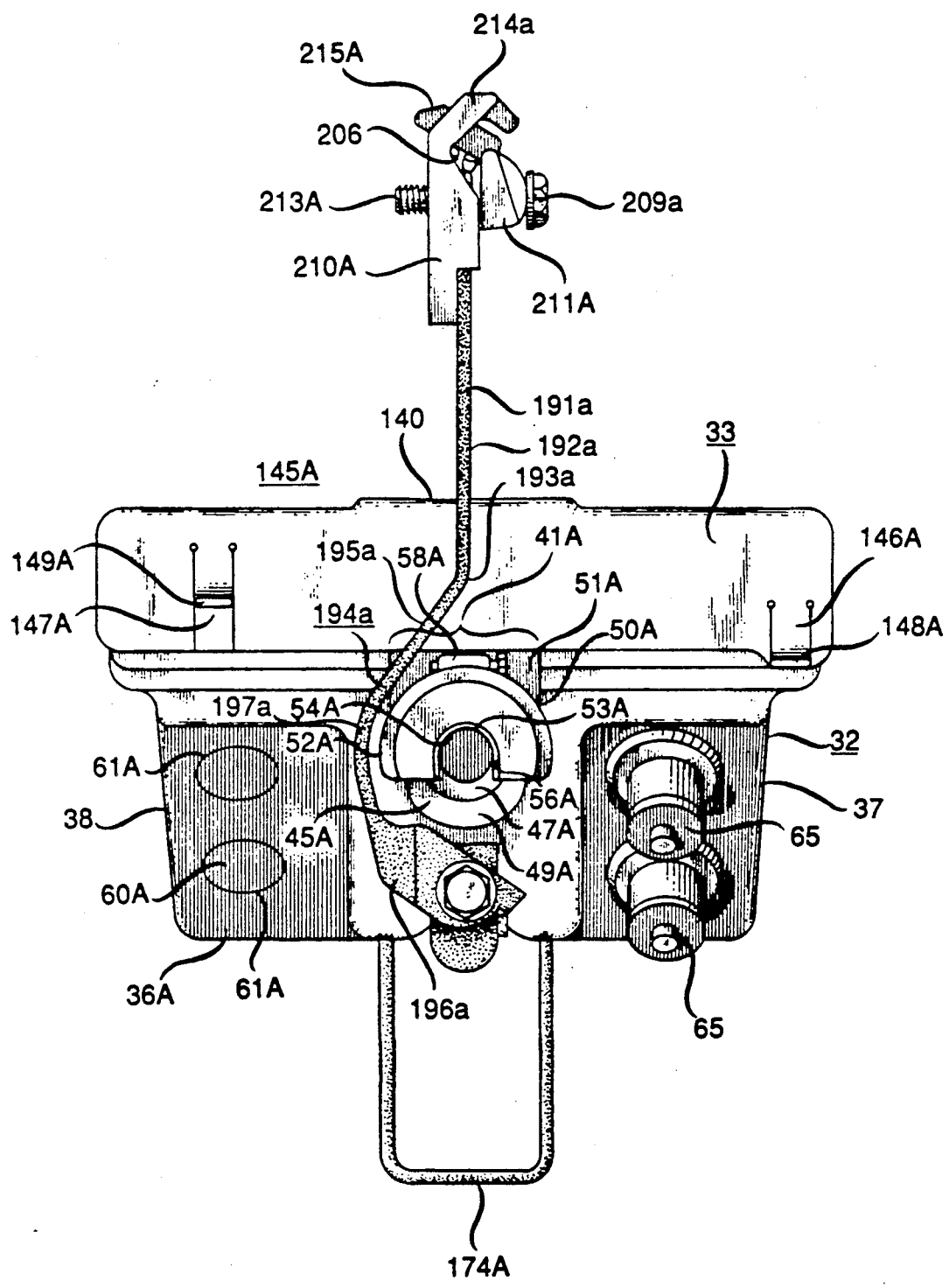
FIG. 3 is a left elevational view of the FIG. 1 case in untilted position.

Referring now to FIGS. 1, 2, 5 and 6 the reference numeral 30 designates an aerial fiber optic cable case of which a component is a container 31 comprising a lower housing 32 and an upper housing cover 33 in the form of a lid. The housing 32 and lid 33 are plastic injection molded parts constituted of, say, glass reinforced polypropylene. The container 31 is weather resistant in the sense that, when left outdoors, it is durable and, although not necessarily airtight, is adapted to protect elements in its interior from rain or snow, wind-blown objects and other harmful agencies.

Figure 5:
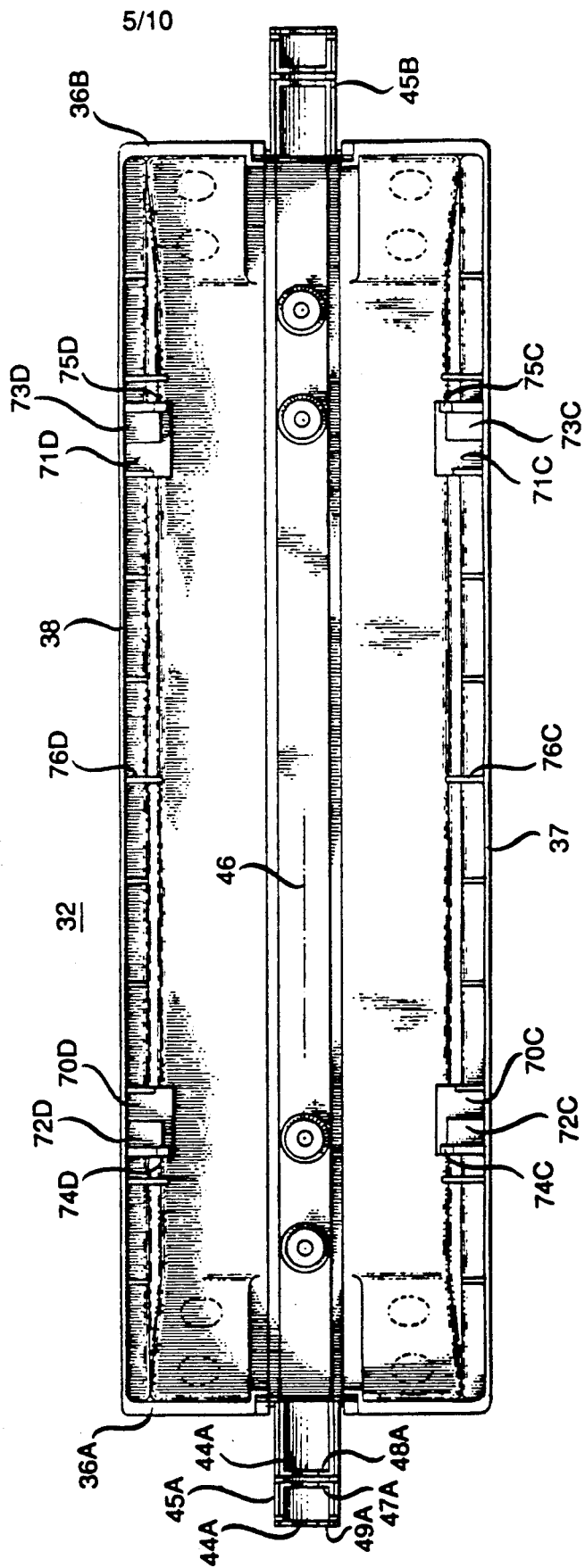
FIG. 5 is a plan view of the lower housing, forming one of the components of the FIG. 1 case, prior to the mounting within such housing of the optical splice support tray shown in FIG. 1 and constituting another of the components of the complete case.
Figure 6:
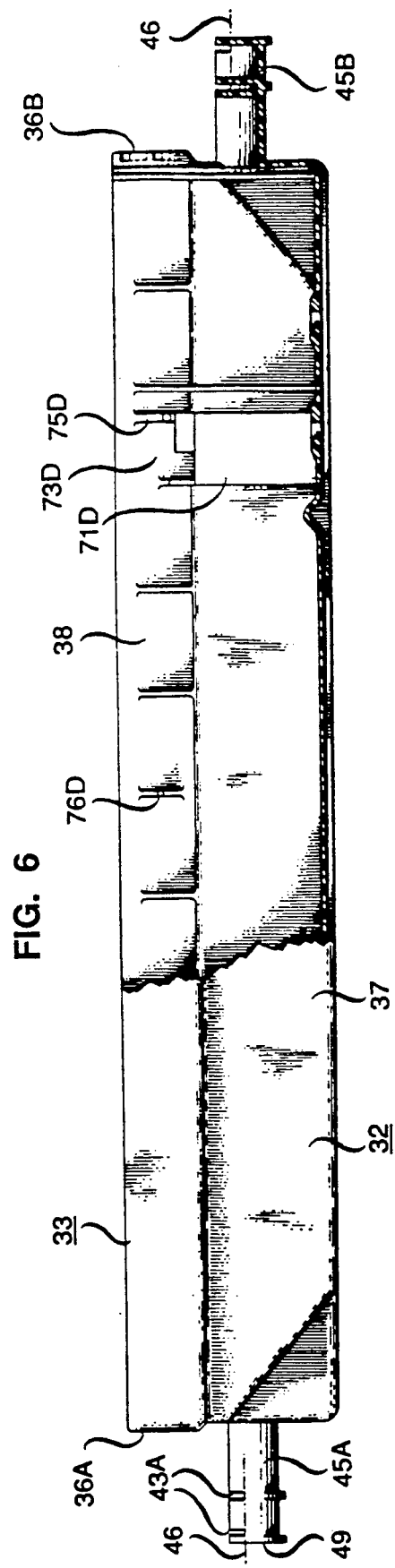
FIG. 6 is a front elevational view of the FIG. 5 housing.

The housing 32 is in the form of a longitudinally extending and elongated open-topped horizontal box having a longitudinal axis centerline and enclosing a chamber 35 open on its upper side and bounded by longitudinally spaced left and right hand end walls 36a, 36b (FIG. 1) provided by the housing, and bounded also by front and rear vertical walls 37, and 38 likewise provided by housing 32. The end walls 36a, 36b extend laterally between the front and rear walls 37, 38 and, in their laterally central regions have formed therein respective vertical openings 41a, 41b which extend from the tops of such walls downwardly thereinto, and which are referred to herein as notch openings because they are open on their upper sides to the exterior environment of the housing. Each of the openings 41a, 41b is flanked on its laterally opposite sides by a pair of vertical holding slots 42 formed in the end wall in which that opening is formed. Openings 41a, 41b terminate downwardly in semicircular bottoms coincident with the semicircular shapes of a pair of horizontal lower nozzles 45a, 45b (FIGS. 5 and 6) integral with and projecting longitudinally outward from respectively, the end walls 36a, 36b respectively containing those openings. The lower nozzles are in the form of semicylindrical shells such that each nozzle has the general cross-sectional shape of half an annulus in lateral transverse planes normal to the longitudinal extent of housing 32. Nozzle 45a has vertical slots 43a formed in its body (FIG. 6), and the nozzle is traversed normal to its axis by inner partition walls 47a, 48a and by an outer partition wall 49a (FIG. 5). Each of such partition walls has formed therein a notch opening 44a for passage through the wall of a partition of a cable about to be described. Lower nozzle 45b is of similar construction to nozzle 45a.

The openings 41 permit insertion from the upper side of housing 32 into chamber 35 of a portion 21 of a fiber optic distribution cable 20 lying when so inserted in a longitudinal path 46 extending through such openings and through such chamber between the bottom and top thereof. The mentioned cable portion 21 which is so inserted is joined at its ends before, during and after insertion to other lengths 22 and 23 of such distribution cable, (i.e. is a central portion of an unbroken length of such cable). Such sidewise insertion of that cable portion into chamber 35 be distinguished from endwise insertion wherein the cable would first be cut to produce a free end thereof, and such free end would then be passed sequentially first through one of openings 41, then through chamber 35 and then through the other of such openings.

The case 30 includes means to provide seals for the passages through openings 41 of the cable portion 21. Such means take the form of a pair of molded plastic seal parts 50a, 50b corresponding to the openings 41a, 41b. Part 50a comprises a flat rectangular vertical panel 51a and an upper nozzle 52a integral with and projecting horizontally from panel 51a and of semicylindrical shape in cross-section in vertical lateral planes. The laterally opposite margins of panel 51a are received in the slots 42 on the laterally opposite sides of opening 41a so that panel 41 is vertically slidable within those slots.

Upper nozzle 52a is adapted to fit over lower nozzle 45a, and the upper nozzle in its interior has vertical cross partitions 53a (FIG. 3) having formed therein respective downwardly extending notch openings 54a. Such partitions are adapted to be received, on laterally opposite sides of such openings within the slots 43a (FIG. 6) in nozzle 45a. Moreover, the upper nozzle 52a has an outer cross partition 55a having a downwardly open notch opening 56a therein. Partition 55a is fittable over the front of the upper part of partition 49a of lower nozzle 45 so that such partition 49a is interleaved between that outer partition 55a of the upper nozzle and the one nearest thereto of the mentioned inner partitions 53a of the upper nozzle.

As a result of nozzles 45a and 52a having the partitions described, the respective notch openings 44a, 54a in the respective partitions of such nozzles cooperate to define a passage which extends in the longitudinal direction through the laterally and transversely central regions of the nozzles when assembled together, and which passage is of a variable vertical size which can be decreased by a pressing of upper nozzle 52a down on lower nozzle 45a. Such pressing is effected in practice by the use of a metallic clamping band 57a (FIG. 1) peripherally surrounding both nozzles, and of a winch 58a (FIG. 3) adapted to tighten that band. When band 57a is tightened by winch 58a to force the nozzles 45a and 52a together, the part of cable portion 21 received in the mentioned variable size passage (defined within the nozzles) is gripped on its upper and lower sides by the described nozzle cross-partitions to thereby create the mentioned seal for the passage of that cable portion through opening 41a in housing end wall 36a into the chamber 35 within the housing 32.

Molded seal part 50b has the same structure as part 50a and is operable in the same way to provide a seal for the passage of cable portion 21 through opening 41b in housing end wall 36b.

Figure 4:
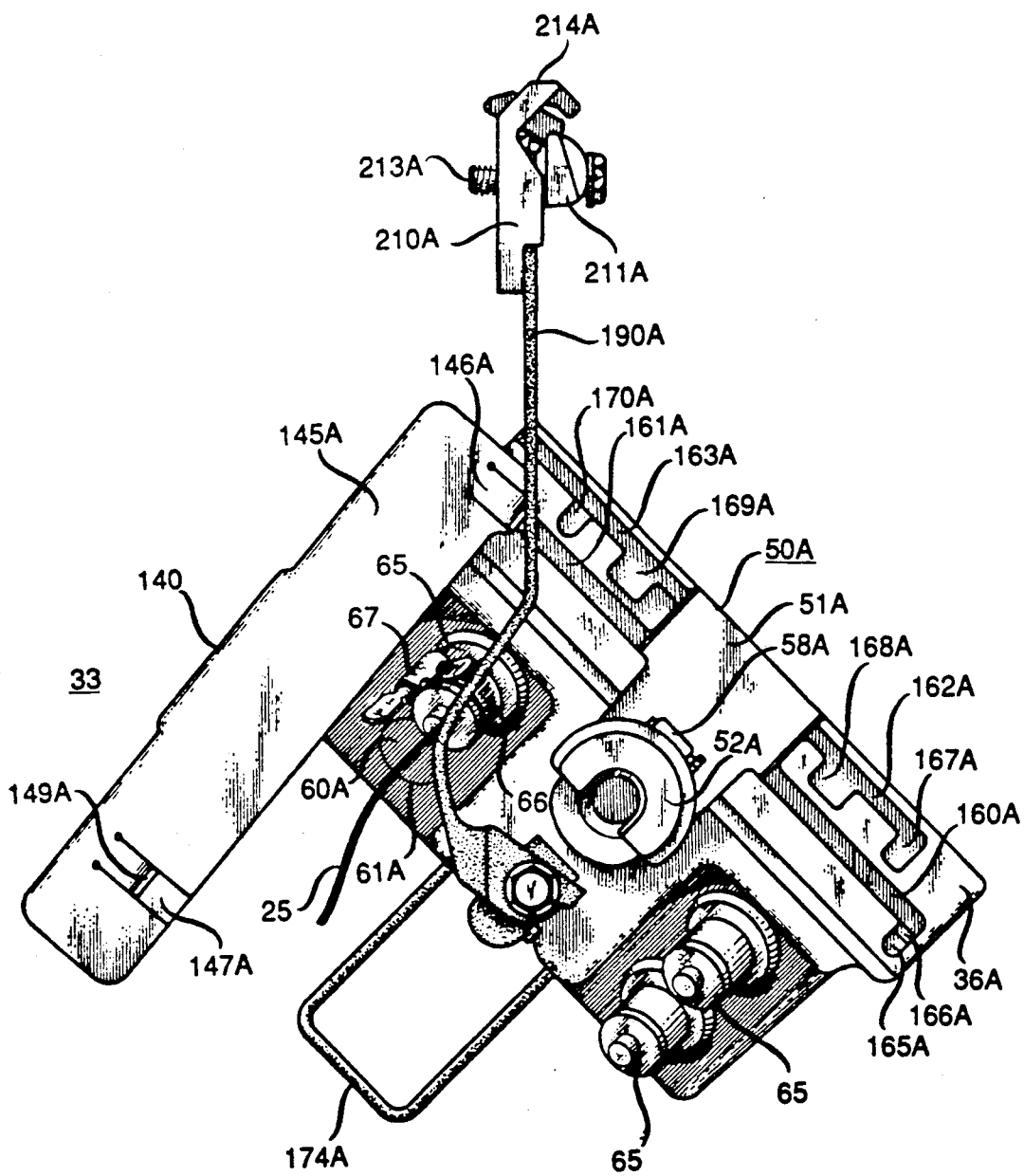
FIG. 4 is a left elevational view of the FIG. 1 case, in tilted position.

The notch openings 41a, 41b in end walls 36a, 36b are accompanied by circular openings 61a, 61b defined in such end walls and plugged when not in use by knockout portions 60a, 60b. FIG. 3 shows on the left hand side of wall 36a a lower such opening 61a remaining plugged by a knock-out portion 60a and an upper such opening 61 which has been unplugged by removal therefrom of its knock-out portion. The openings 61a, 61b have the purpose of permitting passage through housing 32 into its chamber 35 of optic fiber drop cables. FIG. 4 shows one such drop cable 25 of which a free end portion 26 (FIG. 1) has been passed through the upper opening 61a formed in housing end wall 36a (FIG. 3) to the left of the notch opening 41a therein.

The passage of cable 25 through opening 61a is at least partly sealed (FIG. 4) by a seal comprising a grommet 65. Such grommet is in the form of an elastomeric cylindrical plug with an enlarged head at its front, an annular holding flange axially spaced rearward of the head, a central axial bore through the plug for receipt of the cable and a radial slit in the plug permitting sidewise insertion of the free end portion 26 of the cable into that bore. After such portion has so been inserted the grommet 65 is forced, rear end first, from the inside of housing 32 into the mentioned upper opening 61a to pass through the opening (and to the outside of housing 32) the major part of the grommet (including the holding flange) with, however, the enlarged head of the grommet being stopped from passing through such opening so as to remain on the inside of the housing. The grommet is then encircled outside of housing 32 by a metallic clamping band 66, and such band is then tightened by the use of a winch 67 so as to compress the elastomeric material of the grommet and thereby provide a reasonably tight seal for such opening 61a with the cable 25 therein. Similar grommets with accompanying clamping bands and winches are shown in the figures for other of the openings formed in housing 32 to pass drop cables.

Returning to the details of housing 32, its front wall 37 on its inner side has integral left and right hand vertical plastic ribs 70c, 71c (FIGS. 1 and 6) instanding into chamber 35, and the housing rear wall 38 has similar left and right hand ribs 70d, 71d laterally opposite the ribs 70c, 70d. The ribs 70, 71 terminate upwardly in tops having thereon flat horizontal co-planar left and right hand pads 72c, 72d and 73c, 73d integral with the ribs. The pads 72 and 73 are vertically disposed below the open top of chamber 35 but above the horizontal path 46 for passage through that chamber of the distribution cable 20.

The front pads 72c, 73c are overhung by co-planar locking pins 74c, 75c projecting horizontally into chamber 35 from front wall 37 below its top. Similarly the rear pads 72d, 73d are overhung by horizontal locking pins 74d, 75d co-planar with pins 74c, 75c and projecting from rear wall 38 below its top into chamber 35. The pins 74, 75 are accompanied by and are co-planar with horizontal retaining pins 76c, 76d respectively projecting inward from walls 37, 38 at positions longitudinally between the pins 74 and 75.

The pins 74, 75, 76 and the pedestals constituted of ribs 70, 71 and pads 72, 73 together constitute means for mounting in chamber 35, below its top but above path 46, an optical splice support tray 120 similar to that disclosed in U.S. patent application, Ser. No. 264,606 entitled "Optic Fiber Cable Closure" and filed Oct. 31, 1988 in the name of W. H. Bensel et al. and owned by the assignee hereof, such application being incorporated herein by reference and made a part hereof.

Figure 7:
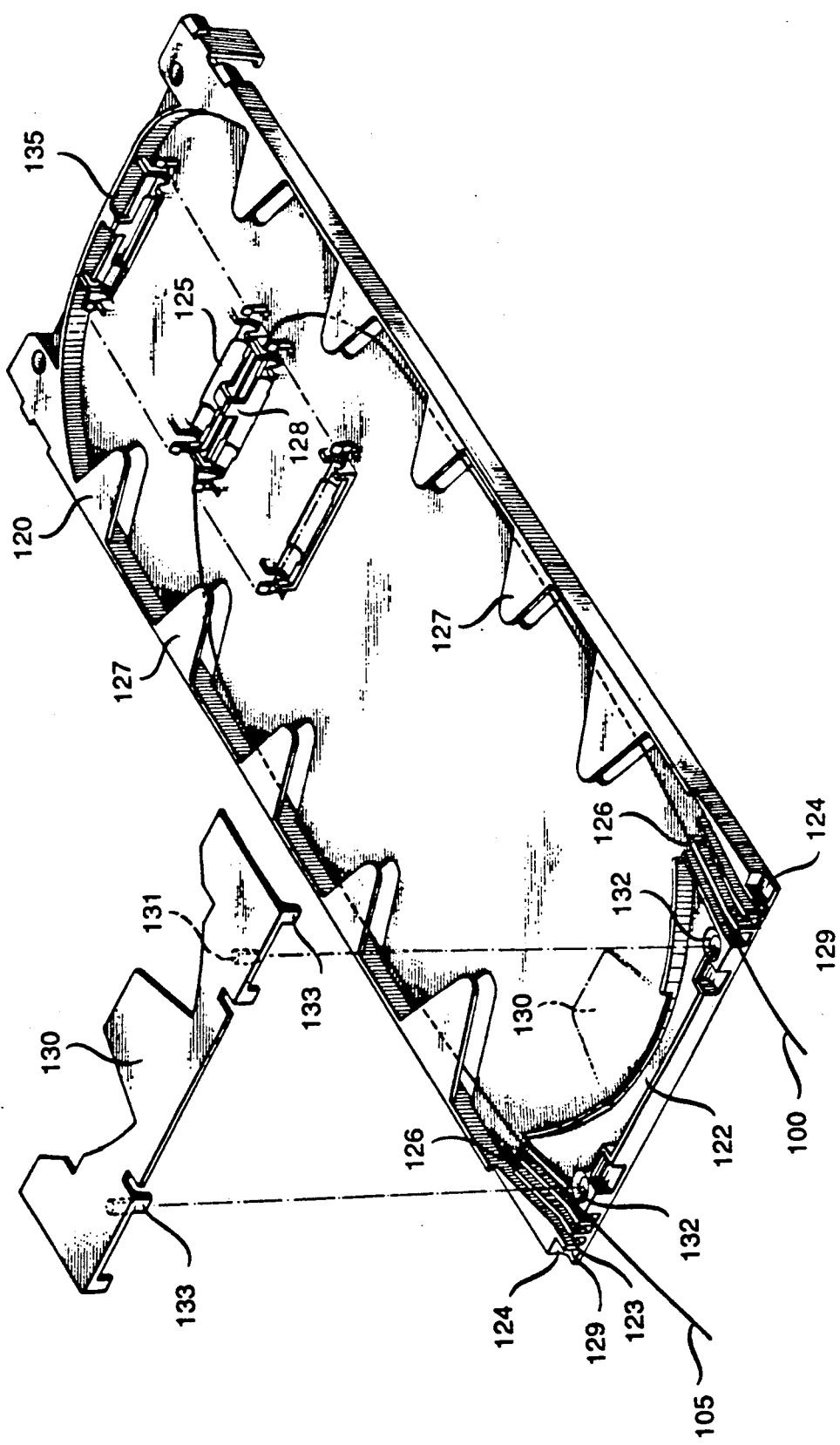
FIG. 7 is an isometric view of the FIG. 1 tray.

Referring to FIG. 7, the tray 120 is adapted to hold one or more spliced optical fiber portions of optical fibers 100 and 105 contained in, respectively, the distribution cable 20 and the drop cable 25. Advantageously, tray 120 is made of a plastic material such as polycarbonate, for example and is adapted to be mounted by either one of the pairs of opposing pins 74c, 74d and 75c, 75d, the tray being shown in FIG. 7 as mounted by pins 74. In order to accomplish that, mounting the tray 120 includes a forward portion 122 having at each of its laterally opposite corners a radiused cut-out 124 (see also FIG. 8) bounded on its laterally inward side by wall 129 (the walls 129 of the two cut-outs being laterally spaced apart by the distance, minus a clearance between the paired pins 74 or between the paired pins 75. As such, the cut-outs 124 form partially enclosing members for the opposed pins 74c, 74d. Also, the portion 122 of the tray 120 includes a plurality of entrance channels 123-123 which are formed between the shown partitions 126-126 or between the partitions and a sidewall. Channels 123 are at the opposite end of tray 120 from its blind or rear end 135.

The tray 120 also includes a plurality of nests 125-125 for holding spliced portions of pairs of optical fibers. The optical fibers may be spliced by fusion or may be spliced by a splice connector such as a rotary mechanical splice connector such as is shown in U.S. Pat. No. 4,545,644 which was issued on Oct. 8, 1985 in the names of G. F. DeVeau, et al. In tray 120, lengths of each pair of spliced fibers may be passed over the tray and secured within clips 128 which are disposed between groups of the nests.

Further, each tray 120 includes a plurality of overhanging portions 127-127. Optical fibers are routed under these portions 127-127 before being turned in toward one of the nests 125-125 for splicing.

Figure 8:
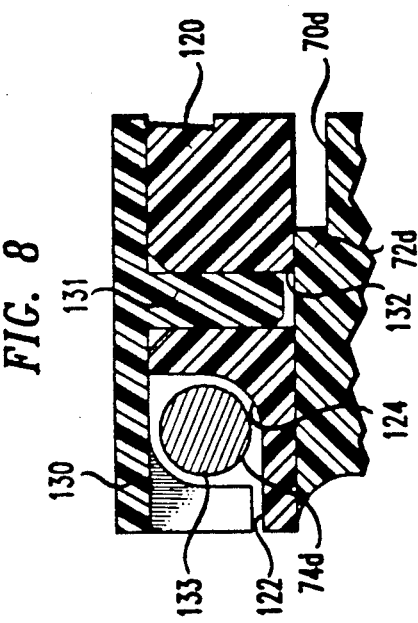
FIG. 8 is a fragmentary view in longitudinal vertical cross section of a portion of the FIG. 7 tray and of mounting means therefor.

Each tray 120 has associated therewith a lock plate 130 (see FIGS. 7 and 8). The lock plate 130 spans across the tray at the optical fiber entrance end and includes a pair of detents 131-131 which are received in openings 132-132 in the tray. The front end of the lock plate 130 which is adjacent to the hinged end of the tray includes radiused downwardly extending tabs 133 (see FIG. 8). When the lock plate 130 is assembled to a tray 120, the radiused tabs 133 cooperate with the radiused cutouts 124 of the tray to trap a pair of opposed locking pins as shown in FIG. 8 for the pins 74c, 74d.

The lock plate 130 has a dual function. Not only does it complete a fastening to housing 32 for its associated tray 120, but it also closes the tops of the channels 123 for optical fibers fed to the upper side of the tray. It will be recalled that optical fibers 100, 105 extend through channels 123-123 into the tray splice area. Advantageously, the lock plate 130 covers those channels thereby securing the fibers against unintentional movement.

To insert tray 120 in housing 32, with lock plate 130 being removed therefrom, the tray is horizontally positioned slightly above the pins 74–76 with the left hand end of the tray being longitudinally spaced rightward by a clearance from the left hand ribs 70c, 70d in chamber 35. Next, the tray is tilted to permit its rear edge to be slid under pin 76d (FIG. 5) then moved towards the housing's rear wall 38 enough to permit the front edge of the tray to clear pin 76c. That front edge is lowered to restore the tray to a horizontal lie, and the tray is laterally centered within housing 32 and then shifted leftward until the front end 122 of the tray rests on the pads 72c, 72d on ribs 70c, 70d, and, further the locking pins 74c, 74d are received within the front and rear cut-outs 124 formed in that tray end 122. Finally, the lock plate 130 is assembled, as described, to tray 120 so that the plate's tabs 133 trap pins 74c, 74d within such cut outs. To prevent longitudinal and vertical movement of tray 120 at its front 122 and angular movement of the tray about a vertical axis or a longitudinal axis. Lateral translational movement of the tray is prevented, except for play, by a bearing of the side walls 129 of the cut outs against the front ends of pins 74. Angular movement of the tray about a lateral axis at its front is, except for play, prevented by the retaining pins 76 which then both overhang the tray.

Figure 9:
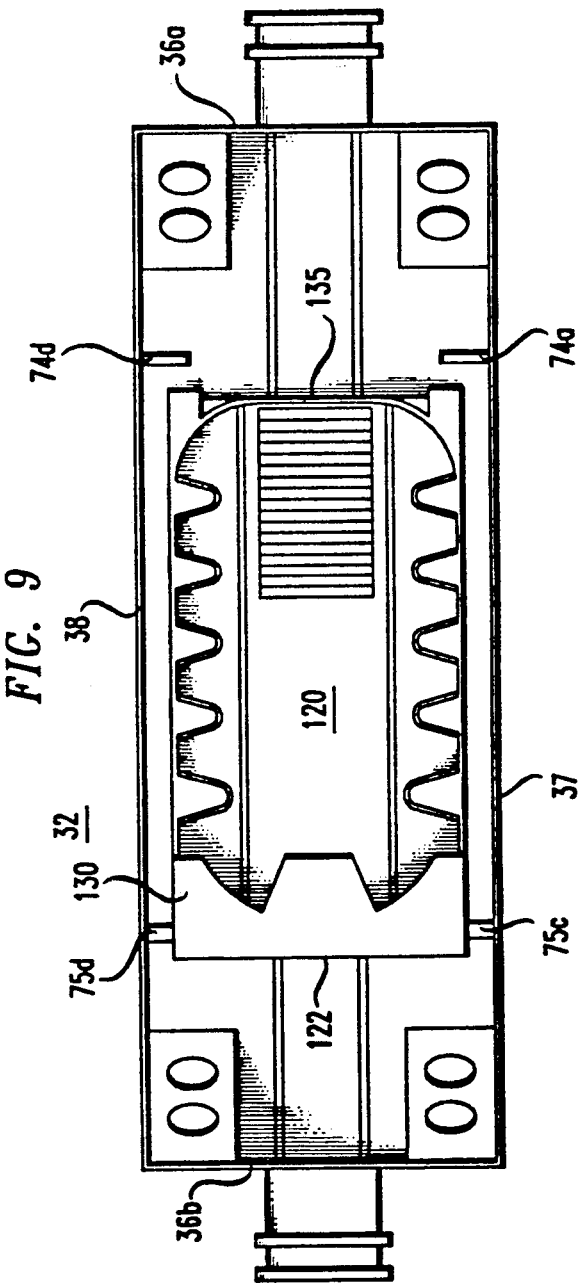
FIG. 9 is a schematic plan view of the FIG. 5 housing and of the mentioned tray when it is mounted in the housing in a position the reverse of that which it is shown as having in FIG. 1.

When tray 120 is so mounted in housing 32, the tray can be said to have a left-hand positioning therein in that the entrance end 122 of the tray is disposed towards the left hand end wall 36a of the housing. Tray 120 may also be mounted within housing 32 in a tray position 180° the reverse of that above described so that locking pins 75c, 75d are trapped within the corner cut-outs 124 of the tray, and the tray's front end 122 is positioned towards the right hand end wall 36b of the housing. Such right-hand disposition of the tray within the housing as schematically depicted in FIG. 9, and the mounting of the tray in such right hand disposition is effected by taking steps which are similar to those described above but, in which the mounting involves the ribs 71c, 71d, pads 73c, 73d and locking pins 75c, 75d. The capability of the housing 32 to insert tray 120 in either a left hand or a right hand position is significant for reasons to be later discussed.

Consideration will now be given to the lid for the housing 32 and how those elements fit together. Lid 33 is weather-resistant like the housing, and the lid is a molded plastic single piece comprising an elongated, flat normally horizontal panel 140, front and rear lips 141, 142 and left and right hand end flaps 145a, 145b, all of which are integral with and depend from the panel 140. The vertical extent of front lip 141 is smaller than that of the rear lip 142 and the flaps 145. The lips and flaps are adapted to fit over the outside of housing 32 so as, together with panel 140, to provide a weather resistant closure for the housing when the lid is in full covering down position.

The vertical wall constituted by end flap 145 contains slits (FIG. 12) running up from its bottom to convert portions of that wall into front and rear arms 146a and 147a having free ends at such bottom and resiliently deflectable longitudinally outward. Such arms on their outer sides have handles 148a, 149a useful in deflecting the arms. On their inner sides, the arms 146a, 147a have raised inwardly-projecting buttons 150a, 151a of which the front button 150a is disposed lower than the rear button 151a. That rear button 151a is on the same level as each of a set of raised or "embossed" bars 152a, 153a, 154a, 155a formed on the inner side of flap 145a laterally between arms 146a, 147a and laterally spaced from each other.

For the purpose of fastening the lid 33 to housing 32, the left hand end wall 36a of the housing has formed therein on its outer side (FIG. 13) a pair of horizontal colinear front and rear lower recessed guideways 160a, 161a on laterally opposite sides of notch opening 41a and, also, a pair of horizontal colinear front and rear upper recessed guideways 162a, 163a similarly on laterally opposite sides of the notch opening 41a in end wall 36a. All of such guideways at their ends towards opening 41a communicate with that opening, but all of such guideways at their other ends are blind except for rear upper guideway 163 which has an opening to the rear of flap 145a. Front lower guideway 160a at its front end has a downturned vertical dogleg 165a which is separated from the horizontal rest of the guideway 160a by a detent ridge 166a horizontally crossing the top of the dogleg and slightly raised above the recessed bounding wall thereof. The upper guideways 162a, 163a on their lower sides have downwardly extending recessed notches 167a, 168a, 169a, 170a formed therein, and the rearmost notch 170a has extending across its top a detent ridge 171a similar to the ridge 166a.

FIG. 14 depicts the cooperation of the raised elements 150a-155a on lid flap 145a with the recessed guideways 160a-163a on housing end wall 36a when lid 33 is fitted on housing 32 to fully cover and enclose its top. For that condition, front button 150a is received in the bottom of dogleg 165a and is yieldably retained there by detent ridge 166a and friction. The short bar 152a is received in notch 169a, long bar 153a is received in notch opening 41a, short bars 154a and 155a are received in notches 168a and 167a, and rear button 151a is received in the bottom of notch 170a to be yieldably retained therein by detent ridge 171a and friction. Because the front and rear buttons 150a, 151a of the lid are so detained in the recesses of housing 32 in which they are received, the left hand end of the lid is firmly but yieldably held all the way down on the top of the housing.

Right hand end flap 145b of the lid and right end wall 36b of the housing are similar in structure and operation to elements 145a, 36a so as to cooperate together to similarly maintain the right hand end of the lid closed all the way down on the housing. For such closed condition of container 31, the lid 33 is disposed parallel to the top of housing 32 (i.e., normal to its vertical center plane) as shown in FIG. 3, and the top portion of such housing is surrounded by the lips 141, 142 and the flaps 145a, 145b of the lid. The lid 33 is then in what will be referred to herein as its "down" position relative to housing 32.

The container 31 is opened in a manner as follows. The handles 148a, 149a on the left hand flap of lid 33 are manipulated to deflect outward the lower ends of arms 146a, 147a to permit the buttons 150a, 151a on those arms to pass upward past the detent ridges 166a, 171a. With arms 146a, 147a being kept so deflected, the whole left hand end of lid 32 is jacked up to move these buttons 150a, 151a up past such detents and into, respectively, the front lower horizontal guideway 160a and the rear upper horizontal guideway 163a. Concurrently with such upward movement of button 151a, short bars 152a, 154a, 155a are displaced from notches 169a, 168a, 167a into front upper guideway 162a, 163a and long bar 153a is moved up in notch opening 41a on the outer side of seal part 50a.

After the left hand end of lid 33 has so been jacked up, its right hand end is similarly treated to bring both ends of the lid to the same level to thus raise the entire lid to an "up" position a step above the previous down position of the lid relative to housing 32. In that initial up position, the housing 32 remains fully covered by the lid.

The lid 33 in its "up" covering position is parallel to itself in the "down" position it previously occupied but, in that "up" position, the lower edge of front lip 141 on the lid is raised above the top of housing 32. Moreover, for that "up" covering position of lid 33 all of the raised elements on the inner sides of the lid flaps are received in corresponding horizontal guideways (or openings 41a, 41b) in the housing ends 36a, 36b in a manner permitting such raised elements to be moved translationally in such guideways in the direction which is front to rear relative to housing 33. Hence the lid as a whole is slidable in such direction relative to housing 33 to progressively uncover more and more of the chamber 35 therein. That front to rear displacement of the lid is effected by pushing it by hand.

Over most of the front to rear travel of the lid, its movement is constrained to be solely a translational self-parallel sliding thereof inasmuch as the presence of one or more of the bars 152-155 in the upper guideways 162-163 forestalls any tendency of the lid to move angularly relative to the housing. As such travel progresses, however, the rear buttons 151 and one after another of the bars 152-155 will be carried by such sliding motion out of the open rear ends of rear upper guideways 163 to the exterior and back of housing 32 until, towards the end of such travel, the last of such bars, namely bars 155, will be so moved out of such guideways. Thereafter, as the lid is pushed by hand to the end of its front to rear travel, which end is fixed by the reaching by front buttons 150 of the blind rearward ends of the rear lower guideways 161, the lid becomes progressively freer to undergo angular movement (concurrently with its front to rear sliding) by pivoting of the lid around those buttons. Thus, at the end of such travel when such buttons are at such blind ends, the lid may be pivoted around these buttons through an angle equal to or about 90° to be folded down towards the back wall of housing 32 and, as shown in FIG. 4, hung down from the top of that housing to lie beside such wall. While the lid 33 in such folded-down condition is still technically in "up" position because front buttons 150 are still at the level of guideways 161 to which they were intially raised from the level of the buttons of the doglegs 165, the lid 32 in such latter "up" position does not cover at all the top of chamber 35 and has, further, by its folding down onto the back side of the housing, been moved out of the way of the top of chamber 35 to thereby promote access to such chamber.

Lid 33 may be returned from its fully folded-over position to its "down" fully covering position on housing 32 by following a sequence of steps the reverse of that described above. Moreover, the lid may, from its folded-down position be removed altogether from the housing by deflecting outwards the arms 146 on the lid end flaps 145 by a great enough amount to permit the buttons 150 to be removed from the guideways 161 so as to completely free the lid from the housing.

Included in the fiber optic cable case 30 is means to provide overhead support for the container 31 of the case. In the exemplary embodiment of the invention disclosed herein, such means takes the form of a support frame comprising (FIG. 2) a horizontal metallic support beam 180 extending longitudinally beneath housing 32 and a pair of vertical left and right hand metallic hangers 185a, 185b straddling container 31 and coupled outward of the laterally opposite ends of that container to the beam 180.

Support beam 180 is in the form of an elongated metal bar having a main straight section 181 extending beneath the bottom 34 of housing 32 and received in a shallow elongated longitudinal re-entrant trough formed in such bottom. Section 181 is fastened to the housing by bolts 182a, 182b passing through the beam and housing 32 and translationally and angularly fixing beam 180 in position relative to the housing. Bolts 182a, 182b are connected at their ends inside chamber 35 to one of the ends of two grounding conductors 175a, 175b of which the other ends have clamps 176a, 176b thereon. Outward of the longitudinally opposite end walls 36a, 36b of the housing, the beam has formed therein sets of right angle bends which configure the beam to have, at a step above section 181, a pair of horizontal extensions 183a, 183b of such beam and, at the laterally outward ends of such extensions, a pair of downturned end braces 184a, 184b having flat faces presented longitudinally outwards.

The metal beam 180 serves, among other of its functions, to lend support to, strengthen and reinforce the plastic container 31.

Formed in the bottom of housing 32 above beam 180 are a pair of longitudinally spaced laterally extending indentations 173 in which are received the upper ends of two rectangular gathering rings 174a, 174b. Rings 174 hang down from container 31 and are angularly pivotable about the centerlines of indentations 173. When, during installation of case 30, drop cable 25 is being coupled to and inserted into housing 32, the free end of the cable may be led through rings 174 to form in the cable one or more loops supported by the rings and preceding a length of the cable slanting from ring 174 rearward and upward to the opening in housing end wall 36a through which the cable passes into the housing's interior. The same rings 174 may be used to store loops of one or more other fiber optic drop cables of which the free ends are inserted into housing 32 through its end wall 36a or its end wall 36b.

The provision of having on case 30 the rings 174 (or other means below housing 32 for taking up slack in the drop cable(s) coupled to the case) offers at least the following advantages. First, ring 174a provides an anchor for cable 25 close to its entry point at end wall 36a to housing 32 to thereby reduce the possible swaying movement (caused by, say, wind) of the cable at such part in that it is only the short length of the cable between such point and ring 174 which is susceptible to undergoing such movement. Second, the cable 25 because bighted around ring 174a necessarily slants upward toward its housing entrance in end wall 36a to thereby induce water accumulated on that cable to migrate away from that entrance rather than towards it. Third, the rings 174 are adapted by permitting such cable loops to be wound thereon to take up any excess slack found to be present in the drop cable(s) in the course of coupling thereof to case 30.

The left hand hanger 185a comprises an elongated metal strap 190a of a width several times greater than its thickness and having principal faces separated in its thickness dimension. One of such faces is designated 191a and, at the upper end of strap 190a, has a rear-to-front presentation.

The strap 190a from its upper end (FIG. 3) first extends vertically straight down over a section 192a to an angulation 193a. Below that angulation 193a, the strap 190a has a rearward incursion or bend 194a formed therein by (a) the rearwardly slanting sections 195a and 196a extending downward and upward from, respectively, angulation 193 and the lower end of the strap, and (b) an arcuate section 197a joining sections 195a and 196a. Incursion 194a extends around and at a distance from the path 46 through housing 32 for fiber optic distribution cable 20 to thereby avoid blockage by strap 185a of passage of that cable along path 46 into the housing while, concurrently, incursion 194a permits the lower end of the strap to be positioned below the bottom of notch opening 41a in housing end wall 36a. That position permits such lower end to be coupled to pivot about beam 180 (as about to be described) along a longitudinal pivot axis 198 passing through housing 32 parallel to its longitudinal centerline. To have hanger 185a so pivotally coupled in effect to housing 32 at such location spaced below the bottom of notch opening 41a (i.e., spaced away from such bottom in the direction of inward extension of that notch) is advantageous in that the coupling is at the centerplane of the housing. Thereby, the housing is at or near to balance about the pivot point in that the housing's center of gravity passes through or nearly through that point. A further advantage is that opening 41a does not cut across any line of transmission of weight from the container 31 to the hanger 185a so as to create unnecessary stress in the housing. Still further, the upward inflections at the ends of beam 180 which are represented by extensions 183 is a feature permitting pivot axis 198 to be close to cable path 46 to thereby promote the positional stability of container 31 when cable 20 is received therein to put weight on the container.

Coming now to the coupling of hanger 185a and beam 180, the strap 190a is, in the vicinity of the junction of its sections 196a and 197a, twisted through 90° about its line of extension so as, at the lower or base end of strap 190a, to change from its previous rear-to-front presentation to a presentation in which face 191a is parallel to and in flat contact with the outer face of brace 184a at the left end of beam 180. At that base end, the strap 190a is pivotally coupled to the beam by a horizontal pivot bolt 199a passing through holes in the strap section 197a and in brace 184a and having a nut 189a threaded on its shank. By virtue of such pivotal coupling, the hanger 185a is adapted to angularly move about pivot axis 198 in the lateral-vertical plane, i.e. normal to the longitudinal extent of container 31. Concurrently, however, the flat contact between wide face 191a of the hanger and the outer broad face of end brace 184a of beams serves to constrain the hanger from substantial angular movement relative to beam 180 in planes through the pivot axis 198 as, say, the longitudinal vertical plane.

Now considering, as between elements 180 and 185a, that the hanger 185a is the fixed reference element, the beam 180 and the container 31 affixed thereto is angularly movable relative to the hanger through a range about pivot axis 198. That range is, however, not unlimited but rather is fixed in a manner which will be described by referring to both hanger 185a and hanger 185b.

Figure 11:
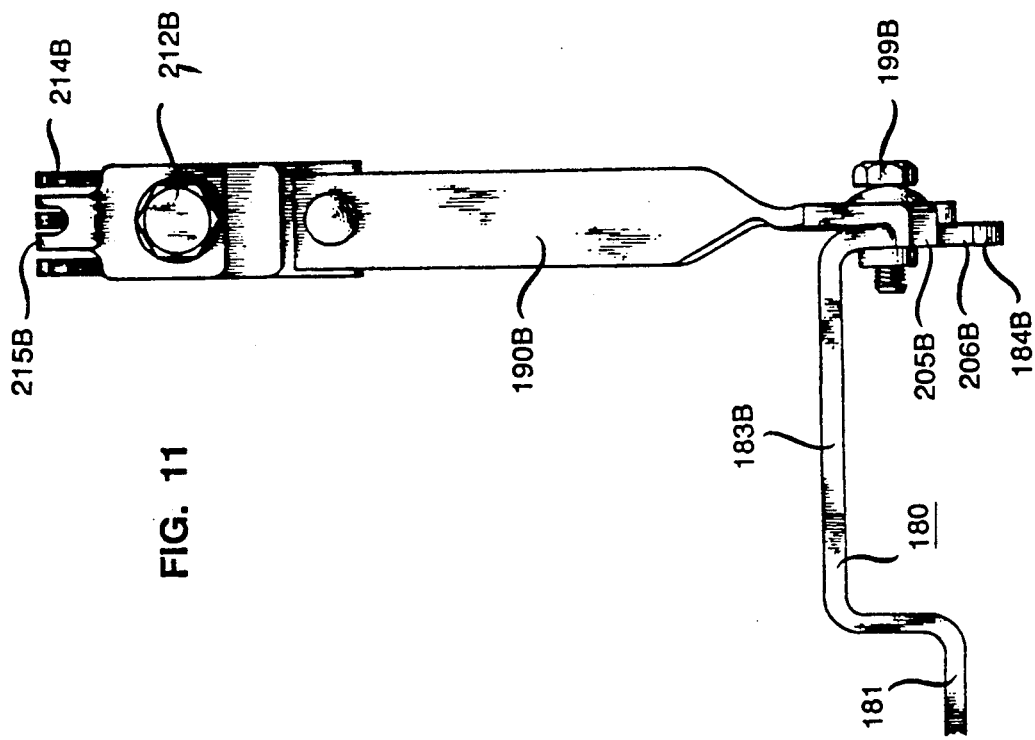
FIG. 11 is a front elevation of the FIG. 10 hanger and of part of the horizontal support beam to which such hanger is pivotally coupled.
Figure 10:
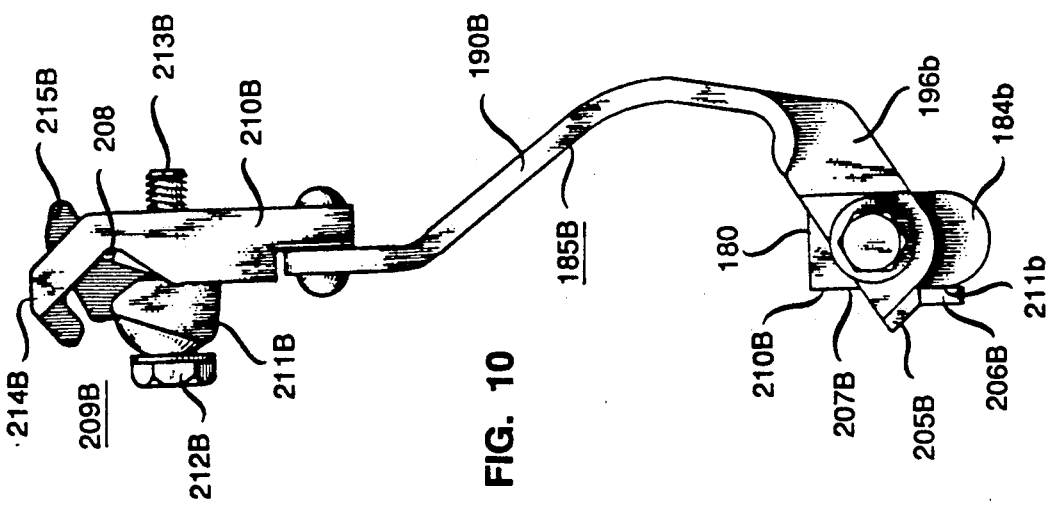
FIG. 10 is a right side elevation of the right hand hanger of the FIG. 1 case.

As best shown by the latter hanger (see FIG. 10) the lower section 197b of its strap 190b has at its lower end two stop lugs 205b and 206b. Of those elements, the upper lug 205b projects longitudinally from strap 190b towards housing 32 to be disposed laterally opposite the front edge 207b of the right end brace 184b of the beam 180. The lug 206b is integrally joined with lug 205b at its free left hand end (FIG. 11) and projects from that end both downward and angularly outward (i.e. away from the beam brace 184b) in relation to the angular lie of lug 206b.

The stop lugs 205b and 206b operate as follows. Assume to begin with that the container 31 is tilted relative to hangers 185a and 185b to be at an angle midway between the angular positions for that container shown in, respectively, FIGS. 3 and 4. Now assume that the container is further tilted by hand in the clockwise (CW) direction relative to FIGS. 3 and 4 and the counterclosure (CCW) direction relative to FIG. 10. As such further tilting is continued, it brings the upper end 210b of the front face 207b of brace 184b into contact with the lug 205b to thereby stop any more forward tilt of the brace 184b and, thus, of the beam 180 and the housing 32 fixedly fastened to that beam.

Next assume that the container is tilted in the opposite or reverse direction to restore it to horizontal position. As such reverse tilting reaches the point at which the container is at or about horizontal, the lower end 211b of the front face 207b of brace 184b strikes the lower stop lug 206b which thereby stops that brace and the affixed beam 180 and housing 32 from further backward tilting relative to hanger 185b.

The hanger 185a has stop lugs which are counterparts of, and operate in the same way as, the lugs 205b, 206b of hanger 185b to restrict the range of angular movement of container 31 relative to the hangers. Accordingly, the stop lugs on such two hangers establish at opposite ends of such range a forward limit position of angular tilt for such container and a rear limit position of angular tilt therefor. Such rear position is depicted in FIG. 3 and is where such container is at or about horizontal. Such forward limit position for the container is depicted in FIG. 4 and is one at which the top of housing 32 is tilted forwardly and down at about 40° away from the horizontal.

The hanger 185a includes means for facilitating fastening thereof to an overhead or aerial support cable 200 (FIG. 1) which is commonly constituted of a multiplicity of interwoven steel wires or strands and which is known in the art as a "strand". The mentioned means of hanger 185 takes the form of a clamp 209a comprising a fixed rear jaw 210a (FIG. 3) having its lower end riveted to the top of the strap 190a of the hanger and having longitudinally spaced teeth 214a at the top of jaw 210a, a movable jaw 211a on the front side of and registering with fixed jaw 210a, and horizontal bolt 212a having a threaded shank 213a passing through unthreaded holes in jaw 211a and then through a threaded hole in jaw 210a in engagement with the threads in such hole. Movable jaw 211a has at its top a set of longitudinally spaced teeth 215a disposed in gaps between teeth 214a.

Clamp 209a is manipulated as follows to fasten hanger 185a to the strand 200. Bolt 212a is turned enough to permit the teeth of jaw 211a to be removed from those of jaw 210a. The fiber optic cable case 30 is then manipulated to position the jaw 210a to the rear of strand 200 (assumed to be, at the time, strung well above ground from one to another of a line of telephone poles on the side of the street) so that the strand lies in the angle formed in the front of jaw 210a at the base of its teeth 214a. The movable jaw 211a is then repositioned to register with the fixed jaw, and the bolt is then turned to advance it into the threaded hole in such jaw. With enough of such advancing, the part of cable 200 disposed between the jaws 210a and 211a is gripped on opposite sides by them to thereby clamp hanger 185a firmly to the cable.

The hanger 185b includes (FIG. 10) a clamp 209b similar in structure and operation to clamp 209a. The two clamps are adapted to fixedly position the case 30 relative to the portion of cable 200 gripped by those two clamps to thereby reduce any tendency of the case when hung from that cable to be set into swinging motion by gusts of wind or the like.

Use of the Embodiment

The described fiber optic cable case 30 may be installed and used as follows.

Assume, as earlier stated, that the strand 200 is strung at a height of, say, twenty feet above ground on a line of telephone poles on one side of a street so that the strand extends from one to the other of such poles. Assume further that strand 200 supports beneath it the fiber optic distribution cable 20 at a height well above ground to be an aerial cable, that there is along such street a residence or other building to which it is desired to supply signals from the optical fiber 100 in cable 20, and that the fiber optic drop cable 25 is connected at one end to such building and is of adequate length. A still further assumption which is made is that looking from the center of the street towards the strand 200 and cable 20 on one side thereof, the central office which supplies signals to cable 20 is off to the left so that those signals are transmitted through such cable in the left to right direction.

Before hanging the case 30 on the strand 200, certain preliminary steps may be taken while the case is still on the ground. As a first such step, the case is given a left-right alignment relative to the strand. That is, considering the showing in FIG. 2 of the case and strand as being a view thereof looking from the center of the street towards its side along which the strand is strung, the case will have a disposition so that what has been referred to as its left and right housing ends 36a, 36b will, in fact, be to the left and to the right in such view, with further, the front wall 37 of housing 32 on the side of the case towards the street's center. That disposition of the case will be referred to herein as its "working disposition".

Second, the container 31 is mostly or fully opened by sliding lid 33 back on housing 32 as earlier described to bring it near to or at the position at which it can be pivoted relative to the housing. The tray 120 is then checked to make sure that its entrance end 122 is towards the housing end nearest to central office from which originates the signals carried by cable 20.

As to the reasons why tray end 122 must be at that housing end nearest such central office, when cable 20 is in place as an aerial cable hung from strand 200 and the cable's fiber of interest 100 is isolated within case 30 from the other fibers of such cable and then cut, only the part of the fiber which is on the side of the cut towards the central office will carry the signals therefrom. It is that part of the fiber 100, therefore, which must be optically spliced to the fiber 105 of the drop cable 25. The aerial distribution cable 20, however, has very little slack therein. It is thus not practical in making such splice for the fiber 100 from the cable to undergo in container 31 any retrograde bending thereof. Instead it is necessary for the part of fiber 100 which is to the side of the cut towards the central station to run straight in from its passage through the end wall of housing 32 to the top of tray 120 and, on such top, to undergo a bend of at most about a quadrant of a circle (as shown in FIG. 7) in the course of bringing the free end of that fiber into registration (for optical splicing purposes) with the free end of drop cable fiber 105. Such straight run in and solely a quadrant bending of that part of fiber 100 towards the central station can, however, only be done if the entrance end 122 of the tray is disposed nearest the end of housing 32 towards such station when case 30 is in its working disposition.

If, as assumed, the central station is off to the left of case 30 when it is hung in working disposition from strand 200, then the entrance end 122 of tray 120 should be towards left end 36a of housing 32 as is depicted in FIG. 1. If, however, the central station is off to the right of case 30 when it is so hung, entrance end 122 of the tray should be nearest to the right end 36b of the housing 32, and, in that case and if tray 120 was originally mounted in housing 32 as shown in FIG. 1, it will be necessary to reverse the mounting of the tray within the housing in the manner described in connection with FIG. 9.

Having provided for a correctly oriented mounting of tray 120 within housing 32, a third step is to connect drop cable 25 to the case. This is done by passing the end portion 26 of such cable through one of the drop cable openings in one of the end walls 36a, 36b of housing 32, and by sealing by a grommet 65 the passage of the drop cable through that opening. The manner of effecting such passage and sealing has been earlier described. The portion 26 of the drop cable disposed inside chamber 35 after being passed through the opening therefor in housing 32 is long enough so that, when most of that portion is stripped (as is then done) to leave only optical fiber 105, that fiber may (FIG. 7) be run through the entrance end 122 of tray 120 over the top of the tray and then bent to meet and be optically spliced with the fiber 100 of distribution cable 20.

The case is installed overhead by being raised to, and brought adjacent to, the strand 200. The clamps 209 on the hangers 185 are then manipulated, as earlier described, to tightly grip the strand to thereby hang the case therefrom in fixed relation therewith. After the case has so been installed, the pivot bolts 199 which couple hangers 185 to beam 180 are loosened and tightened as needed and the container is rocked as needed to dispose and lock it in the forward limit position of tilt for the container depicted in FIG. 4. The lid 33 is, at that time, conveniently slid on housing 32 all the way to its back and then pivoted around the housing to render the lid folded down at the back side of the housing as shown in that figure. Such folding down of lid 33 opens fully the top of housing 32 and puts the lid out of the way of the installer when doing further work (to be described) inside the chamber 35 of the housing. Note in such connection that it is possible to so remove the lid from the access space needed by such installer to work inside such chamber because the lid can first be slid rearward within the space between strand 200 and container 31 and between those elements as far as the lid is so slidable and can then be folded down as described to be outside of such space. In contrast, a lid conventionally hinged to the housing would, on being raised therefrom, strike strand 200 and thus remain in the way of such worker (and not be provided with any means of being kept open) unless the case 30 were to be redesigned in ways which in themselves might be disadvantageous.

When container is at its forward limit position (FIG. 4), it is tilted far enough from the horizontal to permit an installer on the side of housing 32 towards the center of the street to easily do work within the housing, while concurrently, the tilt is not enough to normally lead to spilling of anything out of the housing's chamber 35.

The subsequent steps in the installation are, conveniently, to slide seal parts 50 at the housing ends 36 up and out of their holding slots 42 so as to open up the notch openings 41 in those ends, next to insert the part of cable 20 adjacent container 31 from the side of such container into these openings so that cable portion 21 passes through such openings and the length of chamber 35, and to then replace said parts 50 in their slots 42 to provide seals for the passages of cable 20 through these openings, all as has been earlier described. By those steps, the cable portion 21 is introduced into the housing chamber 35 without needing to cut cable 20 or even interrupt its operation as a signal carrier.

The cable 20 inside chamber 35 is then stripped by the installer to remove its outer plastic jacket 27, its metallic sheath 28 beneath such jacket and its inner plastic tube 29 so as to leave behind in the chamber, except at its ends, only the optical fiber 100, the other fibers 101 contained in the cable and a pair of mechanical strengthening wires 102 extending in cable 20 (as parts thereof) between its outer jacket 27 and its sheath 28. At the chamber ends, stub lengths of such metallic sheath are exposed, and the clamps 176 in chamber 35 are then applied to these stub lengths to electrically connect the cable sheath through conductors 175, beam 180 and hangers 185 to strand 200 to thereby ground that sheath through the strand. In the present case where the central station is assumed to be to the left of case 30 installed on strand 200, the fiber 100 is cut close to the housing right hand end wall 36b so as to create for the fiber a free end portion which extends in chamber 35 from its left hand end and which is long enough to be led to the top of tray 120 through at its entry end 122, then rightwardly along the tray's top, and then bent to meet optical fiber 105 of cable 20 and to be optically spliced with that fiber.

Once such optical splice has been made, the installation is essentially complete. As final steps, the installer first manipulates lid 33 to bring it to down position on housing 32 to thereby close container 31. Second, by loosening pivot bolts 199, rocking the container rearward and retightening those bolts, the container is brought to its rear limit tilt position shown in FIG. 3, and the job is now done. The two steps just described can, of course, be performed in reverse order.

Thereafter it may be necessary to reopen the container from time to time for maintenance purposes or to provide an optical splice or splices within case 30 of the fiber(s) of one or more additional drop cables with one or more additional fibers of the distribution cable 20. At that time, the housing 32 may be opened and then closed by movement of its lid, and the container may next be tilted to forward limit position (FIG. 4), have the work done therein and then tilted back to rear limit position (FIG. 3), all in ways which will be self-evident from the foregoing disclosure.

The above described embodiment being exemplary only, it is to be understood that additions thereto, omissions therefrom and modifications thereof may be made without departing from the spirit of the invention. For example, the described case is not limited to the application of providing a closure for optical fibers included, on the one hand, in an aerial fiber optic distribution cable and, on the other hand, in one more drop cables. Rather the case may well be useful in other cases where the respective fibers to be spliced are from sets of two or more fiber optic cables different than the set of two described above in detail. Further, certain aspects of the invention as exemplified in case 30 such as a cover both slidable and pivotable on a housing or, as another example, the reversibility of mounting of a splice support tray within its container are not limited in application to aerial fiber optic cable cases. A still another example without limitation, aerial fiber optic cable cases according to the invention need not be limited to those for enclosing optical splices of fibers but rather may be cases adapted to receive therein an aerial fiber optic cable of any kind and to have therein particular means for performing a function with respect to the received cable as, say, one or more of the activities of modifying, amplifying, or reconstituting signals carried by the cable received in the case.

Accordingly, the invention is not to be considered as limited save as is consistent with the scope of the following claims.

I claim:

1. An aerial fiber optic cable case comprising: a horizontal longitudinally-extending weather-resistant housing enclosing a chamber open on one side and extending between longitudinally spaced left and right hand walls of said housing, said walls having therein respective notch openings for insertion from the side of said housing into a longitudinal path through such openings and chamber of a portion of a first aerial fiber optic cable, and said housing also having therein at least one opening for entry into said chamber of a portion of at least one second aerial fiber optic cable, means to provide seals for the passages through such openings of such cable portions, a weather-resistant cover adapted to selectively uncover and cover such open side of such chamber, means for mounting in said chamber between said path and said open side a splice support tray longitudinally extending between a first end thereof and a second entrance end thereof for optical fibers which are respective to said first and second cables and are adapted to be optically coupled on such tray by splicing of such fibers, and said case further comprising a support frame coupled to said housing and extending normal to the longitudinal extent of said housing, said frame being adapted to be secured outward of said housing to an aerial strand to thereby hang said case from said strand.

2. An aerial fiber optic case according to claim 1 in which said first and second cables are, respectively, an aerial fiber optic distribution cable and an aerial fiber optic drop cable, said portion of such distribution cable is disposed between and joined to other lengths thereof, and said portion of such drop cable is an end portion thereof.

3. An aerial fiber optic case according to claim 1 in which such means for mounting said tray in said chamber is adapted to mount said tray therein with such tray's entrance end being either towards said left hand wall or said right hand wall of said housing.

4. An aerial fiber optic case according to claim 1 in which said housing and frame are adapted for relative angular movement therebetween about a longitudinal pivot axis through said housing so as to permit angular tilting of said housing relative to said strand when said case is hung therefrom.

5. An aerial fiber optic case according to claim 4 in which said case comprises means for stopping such angular movement at a predetermined angular position existing between said housing and frame and establishing a limit for such movement at one end of a range of such movement between such housing and frame.

6. An aerial fiber optic case according to claim 5 further comprising means to stop such movement at a second predetermined angular position existing between said housing and frame and establishing a limit for such movement at the other end of said range of angular movement.

7. An aerial fiber optic case according to claim 1 in which said frame comprises a pair of hangers longitudinally straddling said housing and cover and extending normal to the longitudinal extent of said housing from respective base ends therefor longitudinally outboard of said walls of said housing to respective free ends belonging to said hangers and displaced outward of said housing and cover, said base ends of said hangers being coupled to said housing to secure said hangers thereto.

8. An aerial fiber optic case according to claim 7 in which said base ends of said hangers are coupled to said housing rearward of the inner extremities of said notch openings in said longitudinally spaced walls of said housing.

9. An aerial fiber optic case according to claim 8 in which, when said case is hung from said strand, said housing is horizontal and said hangers are vertical and said open side of said chamber is on the upper side of said housing, and in which said notch openings extend into said walls of said housing from said upper side thereof, said base ends are coupled to said housing below the bottoms of such openings, and said hangers have portions adjacent such openings which are bent to avoid blockage by such hangers of said port through such opening for such portion of such first cable.

10. An aerial fiber optic case according to claim 7 in which said hangers are metallic, and said support frame further comprises a metallic beam longitudinally extending between, and coupled to, said base ends of said two hangers.

11. An aerial fiber optic case according to claim 10 in which said beam extends beneath said housing to provide support therefor when said case is hung from said strand.

12. An aerial fiber optic case according to claim 10 in which the coupling between said beam and said hangers stiffens said hangers against longitudinal angular play thereof relative to said housing.

13. An aerial fiber optic case according to claim 10 in which said beam is fixed in position relative to said housing, and said case comprises means pivotally coupling said base ends of said hangers to longitudinally opposite end portions of said beam so as to permit relative angular movement between said hangers and housing about a longitudinal pivot axis through the latter.

14. An aerial fiber optic case according to claim 10 in which said beam is electrically coupled to said hangers, and said chamber contains conductor means for electrically connecting portions of a metallic sheath in at least one of said cables to said beam.

15. An aerial fiber optic case according to claim 1 in which said cover comprises a lid coupled to said housing to be adapted for slidable translational movement thereon over said open side of said chamber from the front to the rear thereof and conversely to thereby selectively uncover and cover said open side.

16. An aerial fiber optic case according to claim 15 in which said lid is pivotally coupled to said housing so as, upon being slid to the rear of said chamber, to be angularly movable relative to said housing to a folded down position at which said lid is juxtaposed with said housing's rear side.

17. An aerial fiber optic case according to claim 1 in which said case further comprises means on said frame outward of said housing for facilitating fastening of said frame to said strand.

18. An aerial fiber optic case according to claim 17 in which such means on said frame comprises means for clamping said frame to said strand.

19. An aerial fiber optic case according to claim 17 in which such means on said frame is adapted to fixedly angularly position said frame and strand relative to each other.

20. An aerial fiber optic case according to claim 1 in which said case includes said tray and, also, optical connector means carried by said tray for effecting such splicing of said fibers.

21. An aerial fiber optic cable case comprising a synthetic resinous weather-resistant longitudinally-extending container having openings therein for the inserting into the interior thereof of one or more aerial fiber optic cables, a metallic support frame to connect said container to an overhead support therefor, such support frame comprising longitudinally extending metallic beam means coupled along its longitudinal extent to said synthetic resinous container to lend support to and strengthen said container, and a pair of metallic hanger means coupled to said beam means at respective longitudinally spaced locations thereon and extending from their coupling with said beam means normal to the longitudinal extent thereof and being adapted in use to extend upward thereof, and means on each such hanger means for facilitating its fastening to said support to thereby hang said case from said support so as to maintain said case above ground.

22. An aerial fiber optic cable case comprising a longitudinally extending weather-resistant container comprising a housing and a cover lid therefor, said housing having therein a chamber open on one side, and also having therein openings for insertion into said chamber of one or more aerial fiber optical cables, and said cover being adapted to selectively uncover and cover such open side of such chamber, such case further comprising means for at least partly sealing the passages through such openings of such one of more cables, means coupled to said housing for connecting it to overhead support for said container, such connecting means longitudinally straddling said container and projecting up therefrom when such means is in use, means on such connecting means outward of said housing for facilitating fastening of such connecting means to an aerial strand to thereby hang said case from said strand, and means pivotally coupling said connecting means to said housing to permit relative movement of said connecting means and container over a range of angular movement and, in consequence, angular tilting relative to said strand of said container.

23. A case according to claim 22 in which such case further comprises stop means adapted to prevent the angel of such tilting in a direction from exceeding a predetermined value to thereby set a limit to such tilting.

24. A case according to claim 22 in which said cover is slidably movable in translation relative to said housing to selectively uncover and cover said open side of said chamber.

25. An aerial fiber optic cable case comprising a weather-resistant longitudinally-extending container having openings therein for the inserting into the interior thereof of one or more aerial fiber optic cables, means to connect said container to an overhead support thereof, such connecting means being coupled to said container and extending from its coupling therewith normal to the longitudinal extent thereof and being adapted in use to extend upward thereof, means on such connecting means for facilitating its fastening to said support to thereby hang said case from said support so as to maintain said case above ground, and means coupled to and disposed outside said container to take up and store slack in one or more sheathed fiber optic cables led to said container and inserted thereinto.

26. A case according to claim 25 in which such means coupled to and disposed outside said container comprises two gathering rings each secured to said container over a minor extent of the circumference thereof and free standing from said container.

27. A fiber optic cable case comprising: a longitudinally extending housing having a front side and rear side laterally spaced from each other and having an opening on side thereof from the interior to the exterior of said housing, means providing for insertion into the interior of said housing of one or more fiber optic cables, a lid disposed on such side and movable between front and rear positions thereof relative to said housing to selectively uncover and cover such opening therein, means to substantially constrain movement of such lid over most of its travel between said positions to a lateral translatory sliding movement of said lid relative to said housing, and means operable when said lid is at a far rear position thereof to pivotally couple said lid relative to said housing and to free said lid to move angularly relative to said housing so as to fold down to a position at which said lid is juxtaposed with said rear side of said housing.

* * * * *